United States Patent [19]

Doswald et al.

[11] Patent Number: 4,468,347

[45] Date of Patent: Aug. 28, 1984

[54] SULFO GROUP-FREE DISAZO AND POLYAZO COMPOUNDS CONTAINING AT LEAST TWO BASIC OR CATIONIC GROUP AND WHICH ARE IN METAL-FREE OR 2:1 METAL COMPLEX FORM

[75] Inventors: Paul Doswald, Münchenstein; Emil Moriconi, Basel; Helmut Moser, Oberwil; Horst Schmid, Reinach, all of Switzerland

[73] Assignee: Sandoz Ltd., Basel, Switzerland

[21] Appl. No.: 361,183

[22] Filed: Mar. 24, 1982

Related U.S. Application Data

[63] Continuation-in-part of Ser. No. 261,320, May 7, 1981, abandoned.

[51] Int. Cl.[3] .................... C09B 44/04; C09B 44/08; C09B 45/24; C09B 45/28

[52] U.S. Cl. ............................. 260/147; 260/146 R; 260/146 T; 260/148; 260/152; 260/153; 260/156; 260/157; 260/160; 260/176

[58] Field of Search .............. 260/157, 146 R, 146 T, 260/147, 148, 160

[56] References Cited

U.S. PATENT DOCUMENTS

| | | | |
|---|---|---|---|
| 2,129,964 | 9/1938 | Roos | 269/160 |
| 4,046,502 | 9/1977 | Moser et al. | 8/7 |
| 4,087,244 | 5/1978 | Greve et al. | 8/41 |

FOREIGN PATENT DOCUMENTS

| | | | |
|---|---|---|---|
| 2251041 | 4/1973 | Fed. Rep. of Germany | 260/157 |
| 2250676 | 5/1973 | Fed. Rep. of Germany | 260/157 |
| 3138182 | 4/1983 | Fed. Rep. of Germany . | |
| 1371716 | 10/1974 | United Kingdom | 260/198 |
| 1550830 | 8/1979 | United Kingdom | 260/156 |

*Primary Examiner*—Floyd D. Higel

*Attorney, Agent, or Firm*—Gerald D. Sharkin; Richard E. Vila; Melvyn M. Kassenoff

[57] ABSTRACT

Disazo and polyazo compounds of the formula

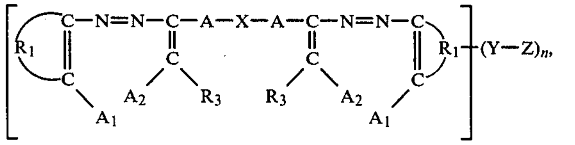

wherein each A is independently

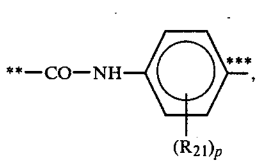

and each $R_1$ and the

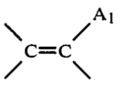

radical to which it is attached, taken together, independently, are

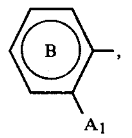

wherein ring B may be substituted by one substituent selected from halogen, $C_{1-4}$alkyl and $C_{1-4}$alkoxy, and each $R_3$ is independently $C_{1-4}$alkyl, or wherein the ** denotes the carbon atom attached to X, or each A, $R_3$ and the

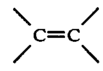

radical to which they are attached, taken together, independently, are each $R_1$ and the

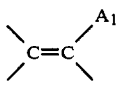

radical to which it is attached, taken together, independently, are the radical of an aromatic carbocyclic or heterocyclic coupling component,

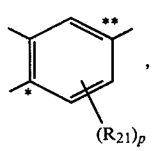

(b)

wherein each $R_{21}$ is independently halo, $C_{1-4}$alkyl or $C_{1-4}$alkoxy, p is 0, 1 or 2, the * denotes the carbon atom attached to the —N=N— radical, and the  denotes the carbon atom attached to X, each $A_1$ and $A_2$ taken together are —O—Me—O—, wherein Me is copper, cobalt, iron, nickel, manganese or zinc, or each $A_1$ is hydroxy, and each $A_2$ is independently hydrogen, hydroxy or $C_{1-4}$alkoxy, X is a direct bond or a bridging radical, each Y is independently a direct bond, $C_{1-4}$alkylene, —CO—NH—$(CH_2)_m$-*, —NH—CO—$(CH_2)_m$* or —$SO_2$—$NR_4$—$(CH_2)_m$-*, wherein $R_4$ is hydrogen or $C_{1-4}$alkyl, m is 1, 2, 3 or 4, and the *** denotes the carbon atom attached to the Z group, each Z is independently $-N(CH_3)_2-\overset{\oplus}{N}H(CH_3)_2\ A^{\ominus}$, $-\overset{\oplus}{N}(CH_3)_3\ A^{\ominus}$,

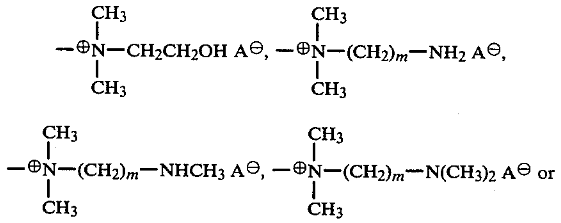

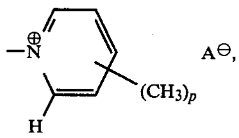

A⊖, wherein

A⊖ is a non-chromophoric anion, m is 1, 2, 3 or 4, and p is 0, 1 or 2, and n is at least 2, with the provisos that (i) the compound is free of sulfo groups, and (ii) when the compound is in metal-free form, each A, $R_3$ and the

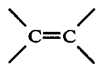

radical to which they are attached form a group of formula (b) and each $R_1$ and the

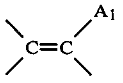

radical to which it is attached together form a 1-phenylpyrazole group the phenyl ring of which is substituted by one —Y—Z group, which compounds are useful for dyeing and printing paper, leather, textile materials comprising natural or regenerated cellulose (for example, cotton, mercerized cotton, alkali treated cotton, hemp, sisal, jute and flax) and fibers, yarns and textile materials comprising polyamide or polyester modified to contain acid groups.

20 Claims, No Drawings

SULFO GROUP-FREE DISAZO AND POLYAZO COMPOUNDS CONTAINING AT LEAST TWO BASIC OR CATIONIC GROUP AND WHICH ARE IN METAL-FREE OR 2:1 METAL COMPLEX FORM

This application is a continuation-in-part of application Ser. No. 261,320, filed May 7, 1981 and now abandoned.

The invention relates to sulpho group-free disazo and polyazo compounds in metal-free or 2:1 metal complex form. By "2:1 metal complex" is meant a complex of 2 atoms of metal with each dyestuff molecule, even though each metal atom is associated with only one azo group.

According to the invention there are provided sulpho group-free symmetrical and asymmetrical disazo and polyazo compounds of formula I in metal-free or 2:1 metallised form

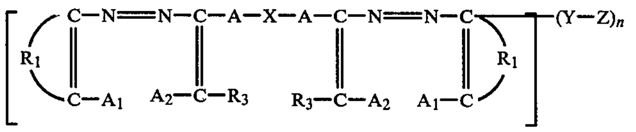
I in which each Y independently is a direct bond, a $C_{1-4}$ alkylene group or a bridging group of the formula $-CO-NH-(CH_2)_m-$ * , $-NH-CO-(CH_2)_m-$ * or 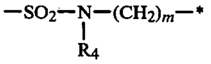

where the above substituents, marked with a star, are attached to the group Z by the carbon atom which is starred, in which m is 1, 2, 3 or 4 and $R_4$ is hydrogen or $C_{1-4}$alkyl;

n is at least 2;

each Z independently is $-N(CH_3)_2$,

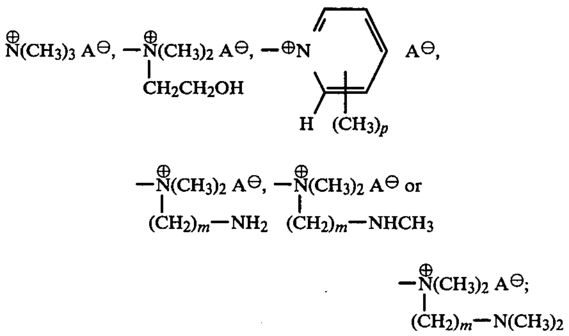

in which p is 0, 1 or 2 and m is as defined above and $A^{\ominus}$ is a non-chromophoric anion;

and either (1) each

A is

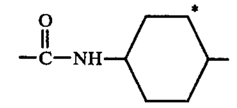

(a), each $R_1$ and the

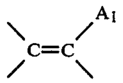

radical to which it is attached, taken together, independently, are

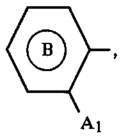

wherein ring B may be substituted by one substituent selected from halogen, $C_{1-4}$alkyl and $C_{1-4}$alkoxy, and each $R_3$ independently is $C_{1-4}$alkyl, the starred carbon atom being attached to group X;

or (2) each

A together with $R_3$ and the ethylene group to which A and $R_3$ are attached, forms the group (b)

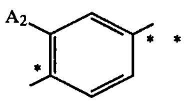
(b)

where the carbon atom * is attached to the azo group and the carbon atom * * is attached to the X group, and each $R_1$ and the

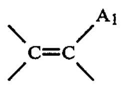

radical to which it is attached, taken together, independently, are the radical of an aromatic carbocyclic or heterocyclic coupling component, and the aromatic rings in groups (a) and (b), independently, can be substituted by one or two groups selected from halogen, $C_{1-4}$alkyl and $C_{1-4}$alkoxy, and $A_1$ and $A_2$, for compounds of formula I in metal complex form, form the group —O—Me—O—, where Me is copper, cobalt, iron, nickel, manganese or zinc, and for metal-free compounds each $A_2$ independently is hydrogen, $C_{1-4}$alkoxy or —OH and each $A_1$ is —OH, with the proviso that, when the compound of formula I is in metal-free form, each A and $R_3$ form the group (b) above and $R_1$ is a 1-phenylpyrazole group, the phenyl group of which is substituted by one group —Y—Z where Y and Z are as defined above.

Preferably when the azo compounds of the invention are in metal-free form, $A_2$ is hydrogen.

Preferably n is 2 to 8, more preferably 2-6, most preferably 2-4, especially 2.

When Z is dimethylamino the compounds of formula I may be in acid addition salt form, each anion of the acid being $A^{\ominus}$ as defined above.

Preferably $R_1$ and the carbon atoms to which it is attached together form a substituted naphthyl group, a substituted pyridone group or a substituted pyrazolyl group.

Preferably X is any one of groups $X_1$ to $X_{46}$, where $X_1$ is a direct bond, $X_2$ is straight or branched chain $C_{1-4}$alkylene and $X_3$ to $X_{46}$ are as listed below:

$X_3$—CO—, $X_4$—NH—CS—NH—, $X_5$—S—, $X_6$—O—,

—CH=CH—, —CH=CH—, $X_8$—S—S—, $X_9$—$SO_2$—, $X_{10}$—NH—, $X_{11}$—NH—CO—, 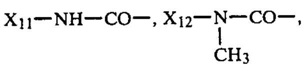

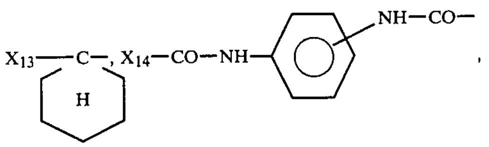

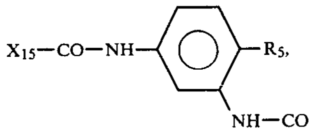

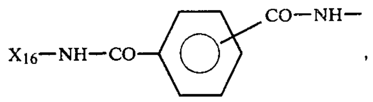

$X_{17}$—$SO_2$—NH—, 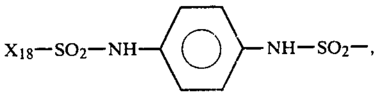

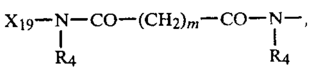

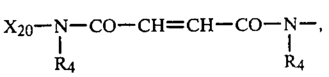

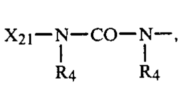 $X_{22}$—CO—NH—NH—CO—, $X_{23}$—$CH_2$—CO—NH—NH—CO—$CH_2$—, $X_{24}$—CH=CH—CO—NH—NH—CO—CH=CH—, -continued

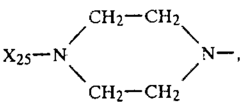

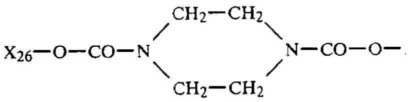

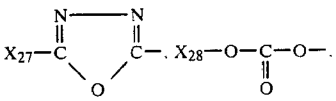

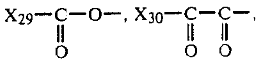 $X_{31}$—O—$(CH_2)_m$—O—,

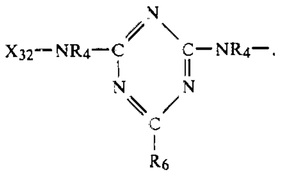

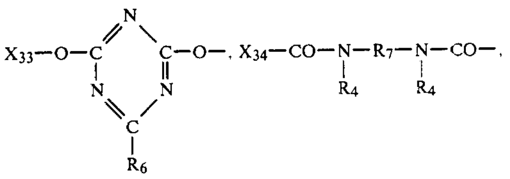

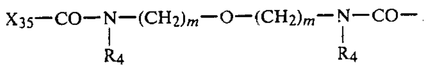

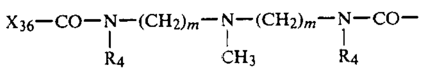

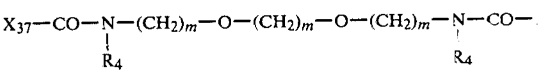

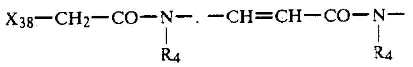

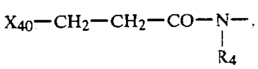 $X_{41}$—$CH_2$—O—$CH_2$—

$X_{42}$—N=N—, $X_{43}$—SO—, $X_{44}$—$CH_2$—S—$CH_2$—, $X_{45}$—$CH_2$—SO—$CH_2$—, $X_{46}$—$CH_2$—$SO_2$—$CH_2$—, where $R_5$ is halogen, $C_{1-4}$alkyl or $C_{1-4}$alkoxy, $R_6$ is halogen, —NH—$CH_2$—$CH_2$OH or —N($CH_2$—$CH_2$—OH)$_2$ and $R_7$ is a straight or branched chain $C_{1-4}$alkylene group.

Preferably X is $X_a$ where $X_a$ is selected from the groups $X_1$, $X_5$, $X_6$, $X_7$, $X_{10}$, $X_{11}$, $X_{12}$, $X_{22}$, $X_{25}$, $X_{26}$, $X_{27}$, $X_{30}$, $X_{42}$ and the groups listed below $X_2'$—$CH_2$—, $X_2''$—$CH_2$—$CH_2$—, $X_2'''$—$(CH_2)_3$—, $X_2^{iv}$—$(CH_2)_4$—.

-continued

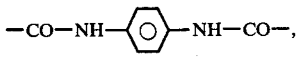

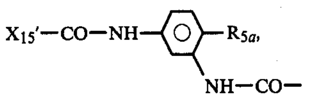

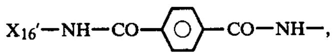

$X_{19}'-NH-CO-CH_2-CH_2-CO-NH-$, $X_{19}''-NH-CO-(CH_2)_4-CO-NH-$,

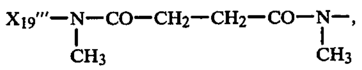

$X_{20}'-NH-CO-CH=CH-CO-NH-$,

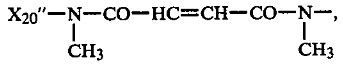

$X_{21}'-NH-CO-NH-$, 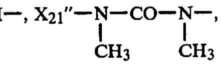

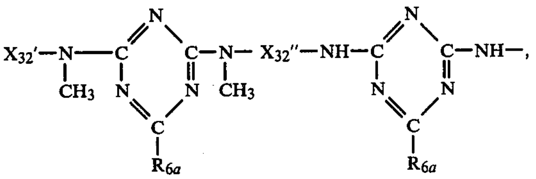

$CO-NH-(CH_2)_2-NH-CO-$, $X_{34}''-CO-NH-(CH_2)_3-NH-CO-$, $X_{34}'''-CO-NH-(CH_2)_4-NH-CO-$,

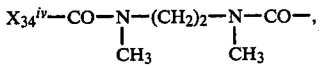

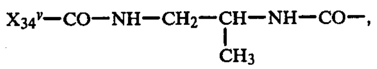

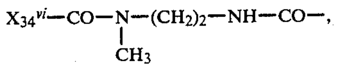

-continued $X_{39}'-CH=CH-CO-NH-$, and $X_{40}'-CH_2-CH_2-CO-NH-$, where $R_{5a}$ is chlorine, methyl or methoxy and $R_{6a}$ is chlorine, $-NH-CH_2-CH_2-OH$ or $-N(CH_2CH_2OH)_2$.

More preferably X is $X_b$ where $X_b$ is $X_1$, $X_7$, $X_{11}$, $X_{12}$, $X_{27}$, $X_2'$, $X_2''$, $X_{14}'$, $X_{19}'$, $X_{19}'''$, $X_{20}'$, $X_{20}''$, $X_{21}'$, $X_{32}'$, $X_{34}'$, $X_{34}^{iv}$, $X_{34}^{v}$, $X_{40}'$ or $X_{42}$.

The preferred significance of $R_3$ is methyl and preferably $R_4$ is $R_{4a}$ where $R_{4a}$ is hydrogen or methyl. Preferably m is m' where m' is 2 or 3 and preferably p is p' where p' is 0 or 1.

Preferably $R_6$ is $R_{6a}$ where $R_{6a}$ is defined above.

Preferably Y is Y' where Y' has the significance of Y except that Y' may not be $C_{2-4}$alkylene. More preferably Y is Y'' where Y'' is $-CH_2-$, $-CO-NH-(CH_2)_{m'}-*$, $-NH-CO-CH_2-*$, or $-SO_2-NH-(CH_2)_{m'}-*$, or 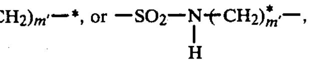

where m' is defined above.

Still more preferably, Y is Y''' where Y''' is $-CH_2-$, $-NH-CO-CH_2*-$ or $-CO-NH-(CH_2)_3*-$.

Preferably Z is Z' where Z' is

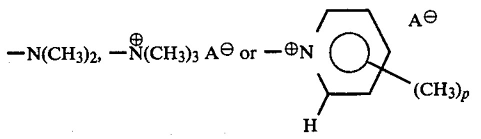

where p is as defined above.

Preferably the compounds of formula I are symmetrical; that is, both groupings attached to the bridging group X are identical.

By the term "halogen" as used herein is meant chlorine or bromine, preferably chlorine.

Preferred sulpho group-free disazo and polyazo compounds of the invention are in metal complex form and are of formula II

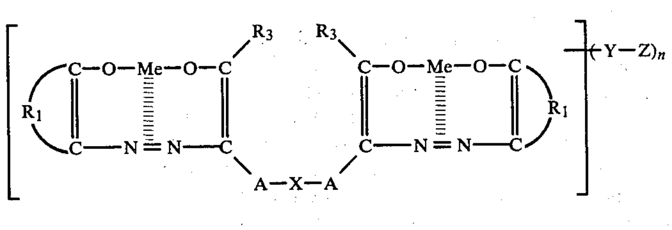

II in which $R_1$, $R_3$, A, X, Y, Z, Me and n are as defined above. Preferably Me is copper.

Preferred metallised compounds of formula II are (a) of formula III

III

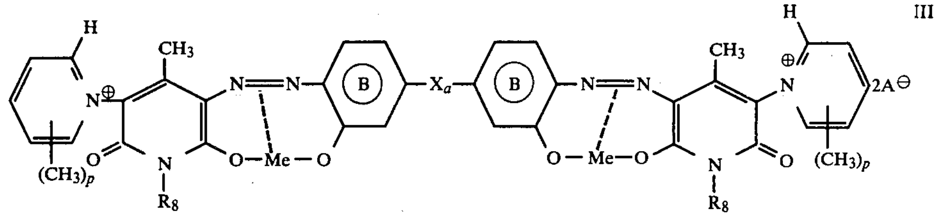

(b) of formula IV

IV

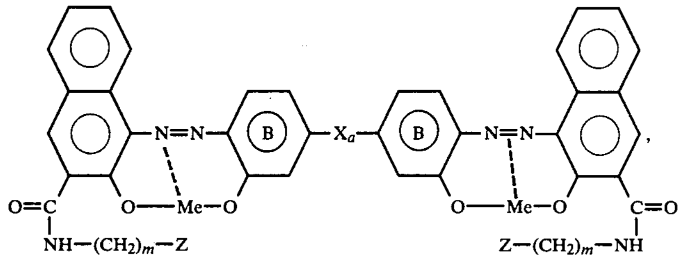

(c) of formula V

V

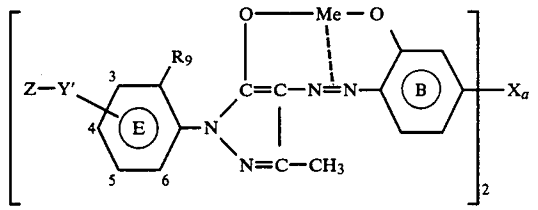

or (d) of formula VI

VI

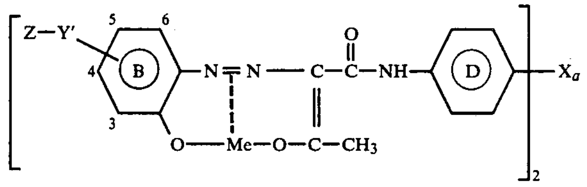

all of which may be symmetrical or asymmetrical, and in which each $R_8$ independently is hydrogen, methyl or $—CH_2CH_2OH$;

each $R_9$ independently is hydrogen or $C_{1-4}$alkoxy each lettered aromatic ring may be further substituted by up to q substituents independently selected from halogen, $C_{1-4}$alkyl and $C_{1-4}$alkoxy, whereby for rings marked B, q=1 for rings marked D, q=2 and for rings marked E, q=1 when $R_9$ is alkoxy and q=2 when $R_9$ is hydrogen, and p, m, Y', Z and $X_a$ are defined above.

The Z—Y'— group in formulae V and VI is preferably located in the 4- or 5-position, more preferably in the 4-position. Preferably rings B, D and E have no substitution in addition to that shown in the formulae.

Preferably $R_9$ is $R_9'$ where $R_9'$ is hydrogen or methoxy, more preferably hydrogen. The preferred metal complexes of the invention are those of formulae III to VI above in which, independently, Me is copper, m is m', $R_4$ is $R_{4a}$, $R_9$ is $R_9'$, p is p', X is $X_b$, Y is Y'' or Y''' and Z is Z', where m', $R_{4a}$, $R_9'$, p', $X_b$, Y'', Y''' and Z' are as defined above.

Of the complexes of formulae III–VI, those of formula V are preferred, particularly symmetrical complexes of formula $V_a$ $V_a$

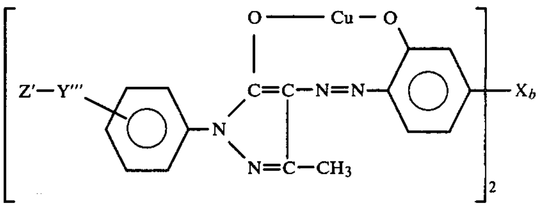

in which Z', Y''' and $X_b$ are as defined above.

An azo compound in metal complex form of formula II may be produced by metallising a compound of formula VII

VII

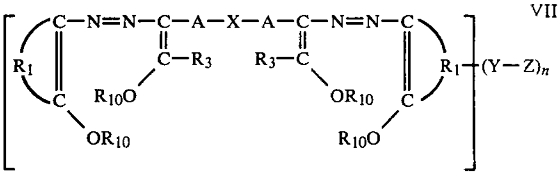

in which $R_1$, $R_3$, Y, Z, X, A and n are defined above, and each $R_{10}$ independently is hydrogen or a $C_{1-4}$alkyl group, preferably $R_{10}$ being $R_{10}'$ where $R_{10}'$ is hydrogen or methyl, with a salt of a metal selected from copper, cobalt, iron, nickel, manganese and zinc to form the 2:1 metal complex.

Preferably the metal atoms are the same in a metal complex of formulae I to VI.

Further the invention provides metal-free sulpho group-free, symmetrical and asymmetric azo compounds of formula VIII

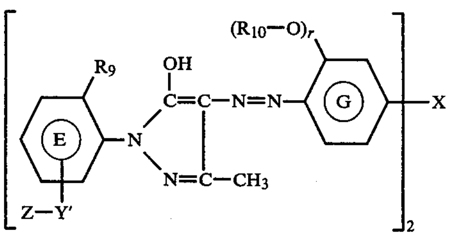

VIII where r is 0 or 1, rings E and G may be further substituted by up to q substituents selected from halogen, $C_{1-4}$alkyl, and $C_{1-4}$alkoxy, whereby for ring G q=1 when r=1 and q=2 when r=0 and for ring E q=1 when $R_9$ is alkoxy and q=2 when $R_9$ is hydrogen in which $R_9$, X, Y', Z and $R_{10}$ are as above defined. These compounds are useful as dyestuffs, and, where r=1, are also intermediates in the preparation of the azo compounds of the invention in metal complex form.

Preferred metal-free azo compounds of the invention are of formula IX

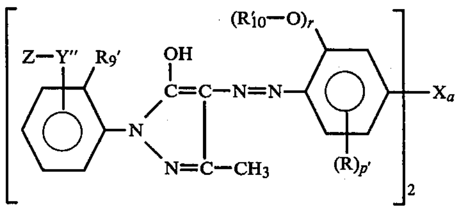

IX in which p', $R_{10}'$, $R_9'$, Y'', Z, m', r and $X_a$ are defined above, and R is chlorine, $—CH_3$, $—C_2H_5$, $—OCH_3$ or $—OC_2H_5$.

The compounds of formula IX are asymmetric or symmetrical, preferably the latter.

More preferred metal-free azo compounds of the invention are asymmetrical compounds of formula IX

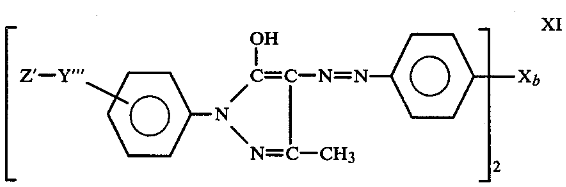

XI in which Z', Y''' and $X_b$ are as defined above.

The production of the metal-free azo compounds of formula VIII is carried out by coupling 1 mole of a tetraazo compound formed from a diamine of formula XII

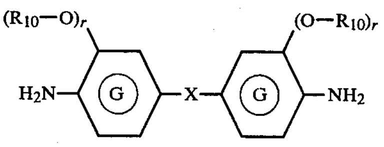

XII with 2 moles of a coupling component of formula XIII

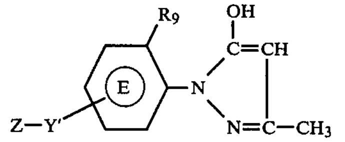

XIII in which $R_9$, $R_{10}$, ring E, ring G, Y' and Z are as defined above. The asymmetrical compounds of formula VIII are synthesised by reacting a tetraazotised diamine of formula XII with one mole of each of two different compounds of formula XIII successively or simultaneously. In a similar fashion the other compounds of formula I may be formed from appropriate tetraazo compounds and coupling components.

In the compounds of the invention the anion $A^{\ominus}$ is not critical. It can be for example any non-chromophoric anion conventional in basic dyestuff chemistry. Suitable anions include chloride, bromide, sulphate, bisulphate, methylsulphate, aminosulphate, perchlorate, lactate, succinate, tartrate, malate, methanesulphonate and benzoate, as well as complex anions, for example zinc chloride double salts and anions of boric acid, citric acid, glycollic acid, diglycollic acid and adipic acid or addition products of orthoboric acid with polyalcohols or cis-polyols. These anions can be exchanged for each other by ion exchange resins or by reaction with acids or salts (for example via the hydroxide or bicarbonate or according to German Offenlegungsschrift Nos 2 001 748 or 2 001 816).

The starting compounds of formula VII must have at least four metal complex forming substituents and are for the most part known (with the exception of the metal-free compounds of formula VIII) or can be made by known methods. The diamines of formula XII and the coupling components of formula XII are known or can be made by known methods. The metallisation process is advantageously carried out by treating 1 mole of azo compound with a metallising agent containing at least 2 equivalents of metal.

The metallisation is carried out by known methods, advantageously in aqueous medium or a mixture of water and a water-miscible organic solvent, for example acetone, lower alkyl alcohols, dimethylformamide, formamide, glycols or acetic acid, at a pH range from 3.5 to 8.0, preferably pH 5 to 7. The metallisation process may be carried out at a temperature from room temperature to the boiling point of the reaction medium. Alternatively, metallisation may be effected in a wholly organic medium (for example dimethylformamide). Advantageously, for instance, cobaltisation may be carried out in the presence of an inorganic nitrite such as lithium, sodium, ammonium or potassium, nitrite, in the ratio of 2 to 6 mols of nitrite per gram atom of cobalt.

Suitable cobalt-yielding compounds are for example cobalt (II) sulphate, acetate, formate and chloride.

Copper-yielding compounds are for example cupric sulphate, cupric formate, cupric acetate and cupric chloride.

The nickel-yielding compounds are Ni (II) compounds, such as nickel formate, nickel acetate and nickel sulphate.

Preferred manganese-yielding compounds are Mn (II) compounds and iron yielding compounds are Fe (II) and Fe (III) compounds. Examples of these and zinc-yielding compounds are manganese iron and zinc formate, acetate and sulphate.

Coupling can be effected by known methods preferably in an acid, neutral or alkaline aqueous medium at a temperature of from −10° C. to room temperature, if necessary in the presence of a coupling accelerator such as pyridine or urea. Alternatively, coupling can be carried out in a mixture of solvents, for example water and an organic solvent.

Preferred azo compounds according to the invention are those for which the cationic molecular weight without the metal atom is 400 to 1200, preferably 450 to 1000, more preferably 500 to 950.

The compounds according to the invention are suitably worked up into a solid or liquid preparation; for example by granulation or by dissolving in a suitable solvent. The compounds of the invention are suitable for dyeing, padding or printing on textile materials, particularly natural or regenerated cellulose materials, for example cotton, mercerised cotton, alkali treated cotton, hemp, sisal, jute or flax.

Exhaust dyeing may be carried out from a long or short bath at a temperature from room temperature to the boil, optionally under pressure, at a goods to liquor ratio of 1:1 to 1:100, preferably 1:20 to 1:50. If dyeing is carried out from a short bath the goods to liquor ratio is 1:5 to 1:15. The pH of the dyebath is generally between 3 and 10.

Exhaust dyeing may be carried out in the presence of added electrolytes, although it is preferable to dye in the absence of added electrolytes. The amount of added electrolyte is usually 0–20 g/l, more usually 0–10 g/l, even more usually 0–5 g/l and most usually 0–2 g/l. Preferred electrolytes are alkali metal salts or alkaline earth metal salts, for example sodium chloride or sodium sulphate.

Printing is carried out by impregnation with a printing paste made up of the dyestuff, water, a thickener, optionally an organic acid (for example acetic acid or formic acid) and optionally an electrolyte, followed by fixation on the fibres. The printing paste is printed by means of a template or roller; and the dyestuff is fixed, for example by steaming at temperatures around 100° C., optionally with an intermediate drying step. Fixation of the dyestuff can be accomplished by a pad-steam process or a thermofixation process for example a pad-roll process in which the temperature should not exceed 230° C. The finishing of the dyeing or print is carried out by known methods.

The compounds of the invention have good substantivity on cellulose.

Preferred dyes according to the invention are those having an exhaust quotient under standard conditions as defined below.

The exhaust quotient is defined as the percentage of the dyestuff originally in the bath which exhausts onto a mercerised cotton yarn after 90 minutes at the boil in an electrolyte-free bath with a goods to liquor ratio of 1:20 containing enough dyestuff to produce a 1/1 standard depth dyeing. Preferably for azo compounds according to the invention the exhaust quotient is in the range 50 to 100%, more preferably 70 to 100%, even more preferably 80 to 100% and most preferably 90 to 100%. The 1/1 standard depth is defined according to NORM DIN 54'000 and ISO NORM R 105/I 1959 part 1.

The dyestuffs on cellulose material (e.g. cotton) produce dyeings having good light fastness and wet fastness (for example water fastness, wash fastness, sweat fastness, peroxide fastness and chlorite fastness).

The dyestuffs of the invention and their preparations can be used for the bulk dyeing of sized or unsized paper. Dyeing of paper can also be carried out by dipping in known manner. The waste effluent of the bulk paper producing process is practically colourless or only slightly coloured by the dyestuffs of the invention, and this is an important factor in prevention of water contamination. The dyes do not run after dyeing on paper nor on the whole are they pH sensitive. The dyeings made on paper with the dyes of the invention show good light fastness and even after long exposure to light mixtures of the dyestuffs remain tone in tone. Further the nuance stability (of the individual dyestuff) is good.

The dyed paper has good wet fastness not only with respect to water but also with respect to milk, fruit juice, sweetened mineral water and alcoholic drinks.

The azo compounds of the invention can be incorporated into dyeing preparations. The process for preparing a stable liquid preparation of the dyestuffs of the invention is known and is for example carried out by dissolving the dye in a suitable solvent system, if necessary in the presence of an auxillary agent such as a stabiliser. This is described in French Pat. No. 1,572,030. Alternatively the dyestuffs of the invention can be granulated according to known methods.

The dyestuffs according to the invention can also be used to dye, pad or print fibres, yarns or textiles consisting of or comprising acid-modified polyamide or polyester fibres. Acid-modified polyamide is described in U.S. Pat. No. 3,039,990 and acid-modified polyester is described in Belgian Pat. No. 549,179 and U.S. Pat. No. 2,893,816.

Dyeing of these textiles can be carried out under conditions suitable for basic dyestuffs, advantageously in acid or neutral aqueous baths preferably at a goods to liquor ratio of 1:3 to 1:80 and at a temperature of 60° C. to 100° C. or under pressure above 100° C.

Dyeing may be carried out in the presence of a conventional auxillary agent, for example dodecyldimethylbenzylammonium chloride as a retarder, the adduct of stearyl alcohol with 50 mols ethylene oxide as a nonionic auxillary agent or benzyloxypropionitrile as an accelerator.

A further use of the dyestuffs according to the invention is to print or dye leather which can be accomplished by known methods.

In dyeing leather, basic dyeable polyamide or basic dyeable polyester the above mentioned preferences regarding the exhaust quotient or the molecular weight (when dyeing or printing on cellulose) do not necessarily apply.

The invention will now be illustrated with reference to the following Examples in which all temperatures are in degrees Centigrade and all parts and percentages are by weight unless indicated to the contrary.

EXAMPLE 1

24.4 Parts of dianisidine base is tetraazotised conventionally in dilute hydrochloric acid and is coupled with 65 parts of coupling component of the formula (a)

(a)

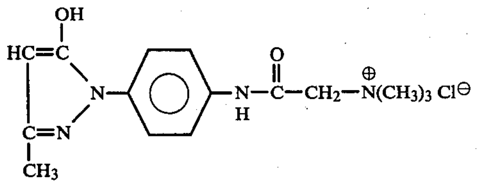

at a pH of 4.

34.4 Parts of the resulting red dyestuff is dissolved or suspended in a mixture of 400 parts dimethylformamide, 42 parts diethanolamine and 13.3 parts copper acetate and the mixture is stirred for 4 hours at 90°.

The reaction product is reduced to half its volume in a rotary evaporator and the resultant solution is precipitated with 3000 parts of acetone. A red copper dyestuff of the formula

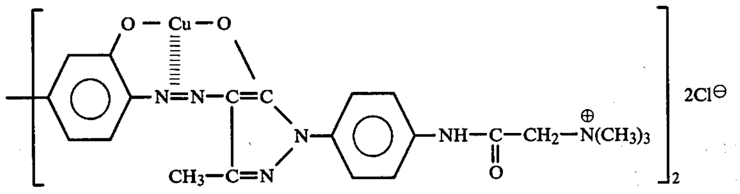

is produced.

The dyestuff has good substantivity and good fastness properties on cotton and paper.

EXAMPLE 2

10.9 Parts of o-aminophenol is diazotised conventionally in dilute hydrochloric acid and coupled at a pH of 3 to 4 with 6-hydroxy-4-methyl-3-pyridiniumpyrid-2-one. After coupling the brown dyestuff suspension is filtered at pH 9, washed and dried. The resulting compound of formula (b)

(b)

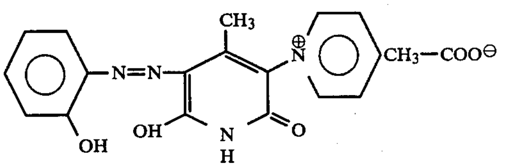

dissolves in dilute acetic acid to give an orange colour.

9.5 Parts of dyestuff of formula (b) is dissolved at room temperature in 92 parts of 92% the sulphuric acid. At a temperature of 20°-25° 1.34 parts formaldehyde (in the form of a 37% solution) is added dropwise to the mixture. The reaction mixture is stirred for six hours and is poured into 1000 parts of acetone under ice cooling. The orange suspension contains a product which is of formula (c)

(c)

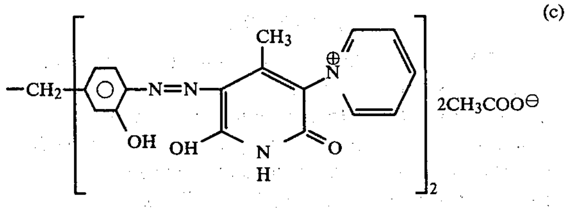

after anion exchange in acetic acid. and is filtered under suction and washed with acetone.

9.1 Parts of the compound of formula (c) is stirred in 100 parts of water at 60° C. and a pH of 4.

6.25 Parts of copper sulphate dissolved in 30 parts of water is added dropwise to the reaction mixture, and the pH of the mixture is held between 4 and 5 by the addition of sodium acetate. The reaction mixture is allowed to react for seven hours, and poured into 1000 parts acetone and the resulting dyestuff is filtered and purified according to known methods to give, after anion exchange the dyestuff of the formula

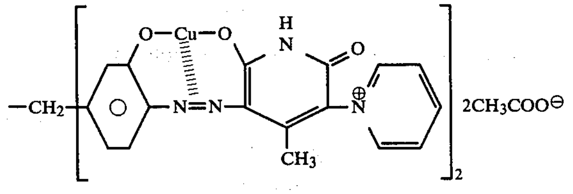

which dyes cotton and paper a brown red shade with good substantivity and good fastness properties.

EXAMPLE 3

Dianisidine is coupled with 6-hydroxy-4-methyl-3-pyridiniumpyrid-2-one by a known method (see German Offenlegungsschrift No. 2,627,680).

15.2 Parts of the resulting known dyestuff is dissolved in 200 parts dimethylformamide and 25.2 parts of diethanolamine and to the solution 8 parts of copper acetate is added. The mixture is warmed over 6 hours to 80° with stirring. The reaction mixture is concentrated in a rotary evaporator and then precipitated in 3000 parts of acetone. The brown suspension is filtered under suction and the solid material is dried. The resultant dyestuff is of the formula

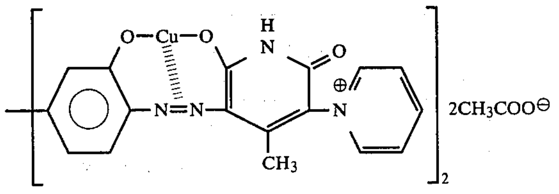

and dyes cotton and paper a brown-violet shade.

EXAMPLE 4

26.7 Parts of a diazo component, produced conventionally by chloromethylating of ortho-nitroanisole, quaternising the chloromethyl group with trimethylamine and reducing the nitro group to an amino group (by the Béchamps reaction) and diazotised in a dilute hydrochloric acid, is coupled with 20.6 parts of diacetic acid dianiside at a pH of 4 to 6. The yellow dyestuff is isolated and dried.

8.9 Parts of the yellow dyestuff is dissolved in 120 parts of dimethylformamide and 12.6 parts of diethanolamine and the solution is mixed with 4 parts of copper acetate. The mixture is stirred for 7 hours at 90° and the reaction volume is then reduced in a rotary evaporator and poured into 3000 parts acetone. The brown suspension is filtered and the solidified mass is washed with acetone and dried to give the dyestuff of the formula

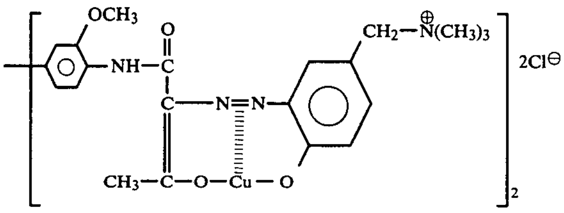

which dyes cotton and paper a yellow shade and has good fastness properties. The dyestuff also has good substantivity on both paper and cotton.

EXAMPLE 5

81 Parts of the compound of formula (d)

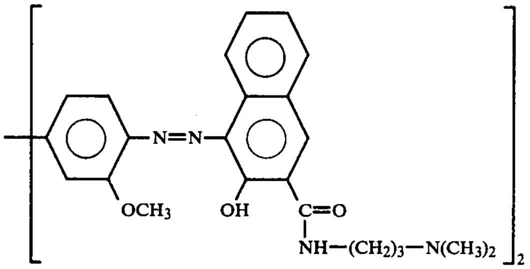

(d)

(described in Swiss Pat. No. 760,329) is dissolved in 1000 parts of dimethylformamide and 126 parts of diethanolamine, mixed with 40 parts copper acetate and stirred for 4 hours at 90°. According to the method of of Example 1 a dyestuff of the formula

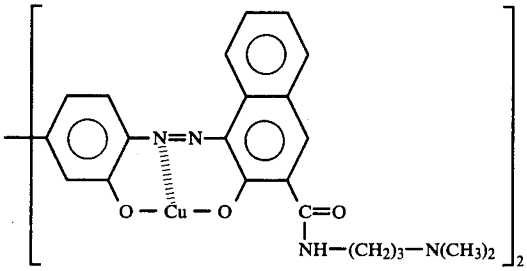

is produced, which dyes cotton and paper a blue shade and has good fastness properties. The dyestuff has good substantivity on both substrates.

EXAMPLES 6-31

By following the procedure of Example 1, with suitable choice of starting materials, symmetrical compounds of the formula

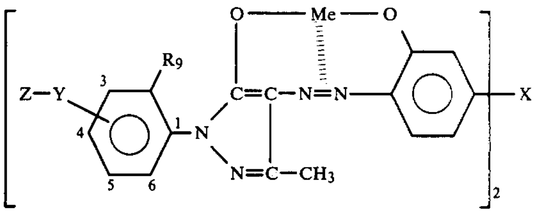

may be produced, in which Z, Y, $R_9$, X, Me and the position of the group Z—Y— are listed in Table I.

Groups X are designated as defined above, groups Z are designated as follows:

$Z_1$ $-N(CH_3)_2$ $Z_2$ $-\overset{\oplus}{N}(CH_3)_3$ $A^{\ominus}$ $Z_3$ $-\overset{\oplus}{N}(CH_3)_2$ $A^{\ominus}$
$CH_2CH_2OH$ $Z_4$ 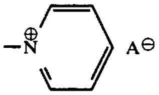

$Z_5$ 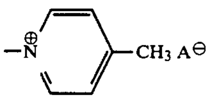

$Z_6$ 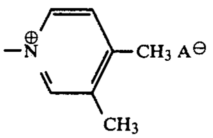

$Z_7$ 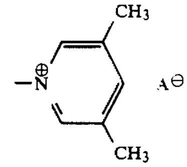

$Z_8$ 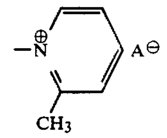

$Z_9$ $-\overset{\oplus}{N}(CH_3)_2$ $A^{\ominus}$
$CH_2-N(CH_3)_2$ $Z_{10}$ $-\overset{\oplus}{N}(CH_3)_2$ $A^{\ominus}$
$(CH_2)_3NH_2$ $Z_{11}$ - a technical mixture of $Z_4$-$Z_8$ above and groups Y are designated as follows:

$Y_1$ $-CH_2-$ $Y_2$ $-NH-CO-CH_2^*-$ $Y_3$ $-SO_2-NH-CH_2-CH_2^*-$ $Y_4$ $-SO_2-NH-(CH_2^*)_3$ $Y_5$ $-CO-NH-CH_2-CH_2^*-$ $Y_6$—CO—NH—$(CH_2)_3$*

TABLE I

| Example No. | Z | Y | position Z—Y— | $R_9$ | Me | X |
|---|---|---|---|---|---|---|
| 6 | $Z_1$ | $Y_4$ | 4- | H | Cu | $X_1$ |
| 7 | $Z_1$ | $Y_6$ | 4- | H | Cu | $X_1$ |
| 8 | $Z_1$ | $Y_6$ | 4- | H | Ni | $X_1$ |
| 9 | $Z_2$ | $Y_1$ | 5- | H | Ni | $X_1$ |
| 10 | $Z_2$ | $Y_2$ | 4- | H | Co | $X_1$ |
| 11 | $Z_2$ | $Y_2$ | 4- | H | Ni | $X_1$ |
| 12 | $Z_2$ | $Y_3$ | 4- | H | Cu | $X_7$ |
| 13 | $Z_2$ | $Y_4$ | 4- | H | Fe | $X_{11}$ |
| 14 | $Z_2$ | $Y_5$ | 4- | H | Zn | $X_{12}$ |
| 15 | $Z_2$ | $Y_6$ | 5- | H | Mn | $X_{27}$ |
| 16 | $Z_3$ | $Y_1$ | 4- | H | Cu | $X_2'$ |
| 17 | $Z_4$ | $Y_2$ | 4- | H | Cu | $X_{14}'$ |
| 18 | $Z_5$ | $Y_2$ | 4- | H | Cu | $X_2''$ |
| 19 | $Z_6$ | $Y_2$ | 4- | H | Cu | $X_{20}'$ |
| 20 | $Z_7$ | $Y_2$ | 4- | H | Cu | $X_{19}'''$ |
| 21 | $Z_8$ | $Y_2$ | 4- | H | Cu | $X_{19}'$ |
| 22 | $Z_9$ | $Y_2$ | 4- | H | Cu | $X_{20}''$ |
| 23 | $Z_{10}$ | $Y_2$ | 4- | H | Cu | $X_{32}'$ where $R_{6a}$ is chlorine |
| 24 | $Z_{11}$ | $Y_2$ | 4- | H | Cu | $X_{34}^{iv}$ |
| 25 | $Z_4$ | $Y_2$ | 4- | H | Cu | $X_{34}'$ |
| 26 | $Z_4$ | $Y_2$ | 4- | H | Cu | $X_{21}'$ |
| 27 | $Z_4$ | $Y_2$ | 4- | H | Cu | $X_{42}$ |
| 28 | $Z_2$ | $Y_1$ | 5- | $OCH_3$ | Cu | $X_1$ |
| 29 | $Z_2$ | $Y_2$ | 4- | $OCH_3$ | Cu | $X_{34}^{v}$ |
| 30 | $Z_2$ | $Y_2$ | 4- | $OCH_3$ | Cu | $X_{39}'$ |
| 31 | $Z_2$ | $Y_2$ | 4- | $OCH_3$ | Cu | $X_{40}'$ |

The compounds of Examples 6–31 give reddish-yellow to bluish-red dyeings on cotton or paper.

EXAMPLES 32-41

By following the procedure of Example 3, with suitable choice of starting materials, symmetrical compounds of the formula

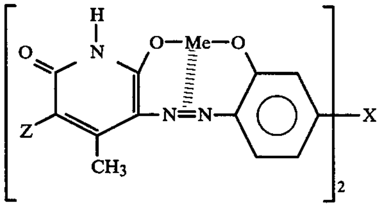

may be obtained, in which X and Me are as given in Table II, Z has any of the significances $Z_4$-$Z_8$ or $Z_{11}$ defined above, as shown in Table II, and $A^\ominus$ is any conventional non-chromophoric anion.

TABLE II

| Example No. | X | Me | Z |
|---|---|---|---|
| 32 | $X_1$ | Ni | $Z_4$ |
| 32 | $X_1$ | Ni | $Z_4$ |
| 33 | $X_7$ | Co | $Z_4$ |
| 34 | $X_{11}$ | Fe | $Z_4$ |
| 35 | $X_{14}'$ | Cu | $Z_7$ |
| 36 | $X_{19}'$ | Cu | $Z_{11}$ |
| 37 | $X_{21}'$ | Cu | $Z_5$ |
| 38 | $X_{27}$ | Cu | $Z_8$ |
| 39 | $X_{34}'$ | Cu | $Z_6$ |
| 40 | $X_{40}'$ | Cu | $Z_4$ |
| 41 | $X_{42}$ | Cu | $Z_4$ |

The dyestuffs of Examples 32–41 dye cotton and paper in red-brown shades.

EXAMPLES 42-51

By following the procedure of Example 4, with suitable choice of starting materials, symmetrical compounds of the formula

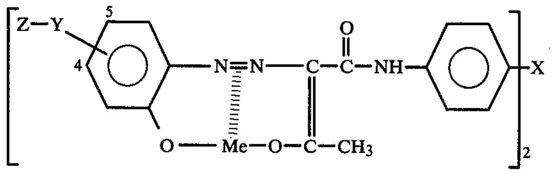

are obtained, in which Z, Y, Me, X and the positions of Z—Y— are as given in Table III.

TABLE III

| Example No. | X | Me | Z | Y | position Z—Y— |
|---|---|---|---|---|---|
| 42 | $X_1$ | Ni | $Z_2$ | $Y_1$ | 5- |
| 43 | $X_7$ | Cu | $Z_1$ | $Y_1$ | 5- |
| 44 | $X_{11}$ | Cu | $Z_2$ | $Y_2$ | 4- |
| 45 | $X_{14}'$ | Co | $Z_3$ | $Y_2$ | 4- |
| 46 | $X_{19}'$ | Fe | $Z_1$ | $Y_4$ | 4- |
| 47 | $X_{21}'$ | Cu | $Z_2$ | $Y_4$ | 4- |
| 48 | $X_{27}$ | Cu | $Z_1$ | $Y_3$ | 5- |
| 49 | $X_{34}'$ | Cu | $Z_1$ | $Y_3$ | 4- |
| 50 | $X_{40}'$ | Cu | $Z_2$ | $Y_5$ | 4- |
| 51 | $X_{42}$ | Cu | $Z_2$ | $Y_1$ | 5- |

The dyestuffs of Examples 42–51 give yellow dyeings on cotton and paper.

EXAMPLES 52-61

By following the procedure of Example 5, with suitable choice of the starting materials, symmetrical compounds of formula

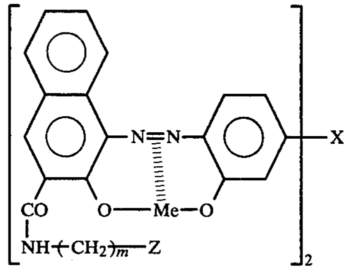

may be obtained, in which X, Me, Z and m are as shown in Table IV and $A^\ominus$ is a conventional anion.

TABLE IV

| Example No. | X | Me | Z | m |
|---|---|---|---|---|
| 52 | $X_2'$ | Cu | $Z_2$ | 2 |
| 53 | $X_7$ | Cu | $Z_3$ | 3 |
| 54 | $X_{11}$ | Co | $Z_4$ | 3 |
| 55 | $X_{14}'$ | Fe | $Z_1$ | 3 |
| 56 | $X_{19}'$ | Ni | $Z_5$ | 2 |
| 57 | $X_{21}'$ | Cu | $Z_6$ | 2 |
| 58 | $X_{27}$ | Cu | $Z_2$ | 3 |
| 59 | $X_{34}$ | Cu | $Z_1$ | 3 |
| 60 | $X_{40}'$ | Cu | $Z_1$ | 3 |
| 61 | $X_{42}$ | Cu | $Z_1$ | 3 |

The dyestuffs of Examples 52–61 give bluish-red to blue dyeings on cotton and paper.

EXAMPLE 62

34.6 Parts of the diamine of the formula

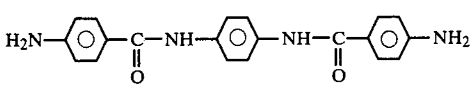

is stirred into 2000 parts of water at 0° to 10°, 57 parts of 30% aqueous HCl and 13.8 parts of sodium nitrite and tetraazotised in known manner. A bright yellow tetraazo suspension is obtained.

65 Parts of the coupling component of the formula

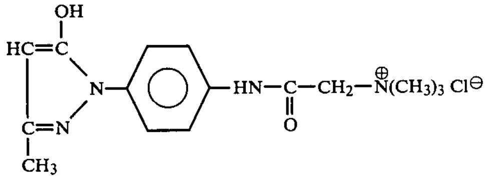

(made by a known method) is dissolved in 400 parts of water and 40 parts of 30% aqueous sodium hydroxide solution and is added to the tetraazo solution at 7° to 10°. The pH rises from 1.5 to about 4.0 and a dark brown highly viscous dyestuff solution is produced. The pH of the solution is brought to about 12 at a temperature of 7°-10° by adding about 40 parts of 30% aqueous sodium hydroxide solution. The solution changes to a yellow large grained suspension. The filtered dyestuff is then dissolved in acetic acid/water solution at 50° and then precipitated in acetone. A yellow water-soluble dyestuff powder of the formula

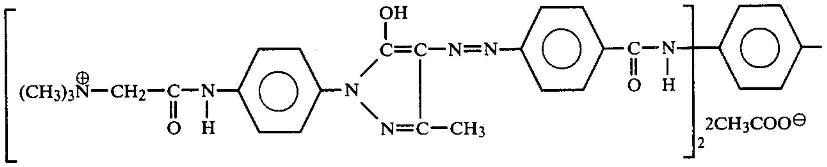

results

The dyestuff has an exhaust quotient of about 90% and gives yellow dyeings on cotton having good fastness properties.

EXAMPLES 63-91

By following the procedure of Example 62 with suitable choice of starting materials, symmetrical metal-free compounds of the formula

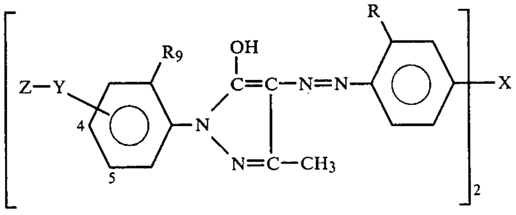

may be obtained, in which Z, Y, $R_9$, R, X and the position of Z—Y— are as shown in Table V

TABLE V

| Example No. | Z | Y | position Z—Y— | $R_9$ | R | X |
|---|---|---|---|---|---|---|
| 63 | $Z_4$ | $Y_2$ | 4- | H | H | $X_{19}'$ |
| 64 | $Z_4$ | $Y_2$ | 4- | H | H | $X_{14}'$ |
| 65 | $Z_4$ | $Y_2$ | 4- | H | H | $X_{11}$ |
| 66 | $Z_4$ | $Y_2$ | 4- | H | H | $X_{27}$ |
| 67 | $Z_4$ | $Y_2$ | 4- | H | H | $X_{34}'$ |
| 68 | $Z_4$ | $Y_2$ | 4- | H | H | $X_{21}'$ |
| 69 | $Z_4$ | $Y_2$ | 5- | H | H | $X_{21}'$ |
| 70 | $Z_4$ | $Y_2$ | 5- | H | H | $X_{14}'$ |
| 71 | $Z_4$ | $Y_2$ | 5- | H | H | $X_{34}'$ |
| 72 | $Z_4$ | $Y_2$ | 5- | H | $OCH_3$ | $X_1$ |
| 73 | $Z_2$ | $Y_1$ | 5- | H | $OCH_3$ | $X_1$ |
| 74 | $Z_1$ | $Y_4$ | 4- | H | $OCH_3$ | $X_1$ |
| 75 | $Z_2$ | $Y_1$ | 5- | H | H | $X_{14}'$ |
| 76 | $Z_2$ | $Y_1$ | 5- | H | H | $X_{11}$ |
| 77 | $Z_2$ | $Y_2$ | 4- | H | H | $X_7$ |
| 78 | $Z_2$ | $Y_2$ | 4- | H | H | $X_{42}$ |
| 79 | $Z_2$ | $Y_2$ | 4- | H | H | $X_{39}'$ |
| 80 | $Z_2$ | $Y_2$ | 4- | H | H | $X_{40}'$ |
| 81 | $Z_1$ | $Y_6$ | 4- | H | $OCH_3$ | $X_1$ |
| 82 | $Z_3$ | $Y_3$ | 4- | H | H | $X_7$ |
| 83 | $Z_5$ | $Y_5$ | 4- | H | H | $X_2'$ |
| 84 | $Z_8$ | $Y_1$ | 4- | H | H | $X_2''$ |
| 85 | $Z_9$ | $Y_2$ | 4- | H | H | $X_{12}$ |
| 86 | $Z_{10}$ | $Y_1$ | 4- | H | H | $X_{19}'''$ |
| 87 | $Z_2$ | $Y_2$ | 4- | $OCH_3$ | H | $X_{20}'$ |
| 88 | $Z_4$ | $Y_2$ | 4- | $OCH_3$ | H | $X_{20}''$ |
| 89 | $Z_2$ | $Y_2$ | 5- | $OCH_3$ | H | $X_{32}''$ where $R_{6a}$ is chlorine |
| 90 | $Z_4$ | $Y_2$ | 4- | $OCH_3$ | $OCH_3$ | $X_{34}^{IV}$ |
| 91 | $Z_2$ | $Y_2$ | 4- | H | H | $X_{34}^{V}$ |

The compound of Example 73 may be made into a stable liquid preparation by dissolving 10 parts of the dyestuff in a mixture of 45 parts glacial acetic acid and 45 parts water at 40°-60°. The dyestuffs of Examples 63-91 dye cotton and paper in yellow to reddish-yellow shades.

The compounds of Examples 9-42, 44, 45, 47, 50-54, 56-58, 63-73, 75-80 and 82-91 are in acetate or chloride salt form but the acetate or chloride ion may be replaced by another non-chromophoric anion.

Application Example A

70 Parts of a chemically bleached sulphite cellulose (from conifer wood) and 30 parts of a chemically bleached sulphite cellulose (from birch wood) is ground in a Hollander in 2000 parts of water. 0.2 Parts of the dyestuff of Example 1 or 62 is added to this mass. After 20 minutes of mixing, paper is produced from this mass. The absorbent paper so produced is dyed red or yellow and the backwater is practically colourless.

Application Example B 0.5 Parts of the dyestuff of Example 1 or 62 is dissolved in 100 parts of hot water and cooled to room temperature. The solution is added to 100 parts of chemically bleached sulphite cellulose, which has been ground in a Hollander with 2000 parts of water. After 15 minutes mixing, the mixture is sized. Paper produced from the mass has a red or yellow shade of medium intensity with good wet fastness properties.

Application Example C

An absorbent paper web of unsized paper is dyed at 40° to 50° with the following dyestuff solution:

0.5 parts of the dyestuff of Example 1 or 62
0.5 parts starch
99.0 parts water.

The surplus dyestuff solution is pressed out between two rollers. The dried paper web is dyed a red or yellow shade.

Application Example D

2 Parts of the dyestuff of Example 1 or 62 is dissolved in 4000 parts of softened water at 40° in a bath and 100 parts of resin-finished cotton fabric is added to the bath, which is heated over 30 minutes to boiling. The bath is maintained at this temperature for one hour and topped up with water from time to time. The dyeing is then taken from the bath, washed with water and dried. The dyestuff exhausts practically completely onto the fibres and the spent dyebath is practically colourless. The dyeing produced has a red or yellow shade with good light fastness and good wet fastness properties.

Application Example E

Acid modified polyamide fibres are immersed at 20° at a goods to liquor ratio of 1:80 in an aqueous bath containing 3.6 g/l potassium dihydrogen phosphate, 0.7 g/l disodium hydrogen phosphate, 1 g/l of auxiliary agent (for example the reaction product of a phenol with excess ethylene oxide) and 0.15 g/l of the dyestuff of Example 1 or 62.

The bath is heated for about 30 minutes to boiling and is maintained at this temperature for a further 60 minutes. After washing and drying, a red or yellow dyeing is produced with good fastness properties. Acid modified polyester material and acid modified polyamide material may also be dyed by similar methods.

Similarly good dyeings can be obtained in Application Examples A-E by substituting an equivalent quantity of a liquid preparation of the dyestuff or a granular preparation of the dyestuff for the pure dyestuff.

Application Example F

1000 Parts of freshly tanned and neutralised chrome grain leather are soaked in a bath of 250 parts water and 0.5 parts of the dyestuff of Example 1 or 62 for 30 minutes at 55°, then treated in the same bath for 30 minutes with 2 parts of an anionic fat liquor based on sulphonated train oil, then dried and finished in conventional manner. A leather evenly dyed in red or yellow shade is obtained.

Calf suede leather, chrome-vegetable tanned sheepskin and box cowhide leather can also be dyed by known methods.

The dyestuffs of Examples 2-61 and 63-91 can be used according to Application Examples A-F with similarly good results.

What is claimed is:

1. A 2:1 metal complex of the formula

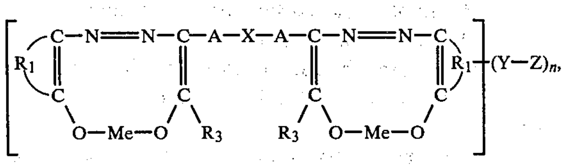

wherein each A is independently

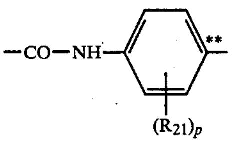

, each $R_1$ and the

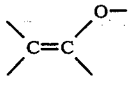

radical to which it is attached, taken together, independently, are

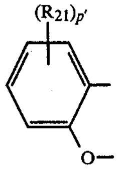

, and each $R_3$ is independently $C_{1-4}$alkyl, or each A, $R_3$ and the

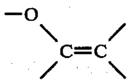

radical to which they are attached, taken together, independently, are

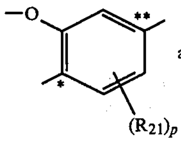

and, each $R_1$ and the

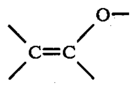

radical to which it is attached, taken together, independently, are the radical of an aromatic carbocyclic or heterocyclic coupling component, wherein each $R_{21}$ is independently chloro, bromo, $C_{1-4}$alkyl or $C_{1-4}$alkoxy, p is 0, 1 or 2, p' is 0 or 1, the * denotes the carbon atom attached to the —N═N— radical, and the  denotes the carbon atom attached to X, X is a direct bond or a bridging radical, each Y is independently a direct bond, $C_{1-4}$alkylene, —CO—NH—$(CH_2)_m$—*, —NH—CO—$(CH_2)_m$—* or —$SO_2$—$NR_4$—$(CH_2)_m$—*, wherein $R_4$ is hydrogen or $C_{1-4}$alkyl, m is 1, 2, 3 or 4, and the *** denotes the carbon atom attached to Z, each Z is independently

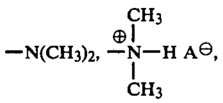

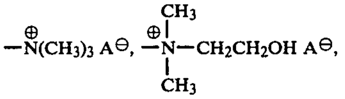

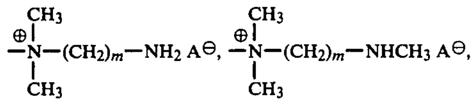

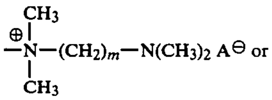

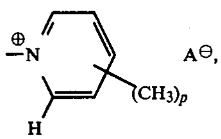

wherein $A^{\ominus}$ is a non-chromophoric anion, m is 1, 2, 3 or 4, and p is 0, 1 or 2, each Me is independently copper, cobalt, iron, nickel, manganese or zinc, and n is at least 2, with the proviso that the 2:1 metal complex is free of sulfo groups.

2. A 2:1 metal complex according to claim 1 wherein X is a direct bond, straight or branched $C_{1-4}$alkylene,

—CO—, —NH—CS—NH—, —S—, —O—, —CH═CH—, —S—S—, —$SO_2$—, —NH—, —NH—CO—,

—N($CH_3$)—CO—, 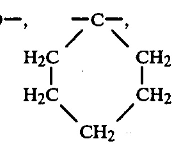

-continued

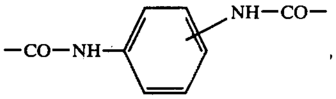

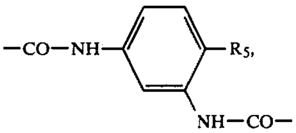

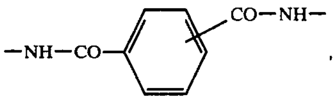 , —$SO_2$—NH—,

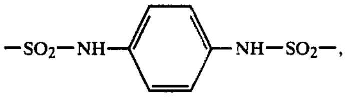

—$NR_4$—CO—$(CH_2)_m$—CO—$NR_4$—,
—$NR_4$—CO—CH═CH—CO—$NR_4$—, —$NR_4$—CO—$NR_4$—,
—CO—NH—NH—CO—,
—$CH_2$—CO—NH—NH—CO—$CH_2$—,
—CH═CH—CO—NH—NH—CO—CH═CH—,

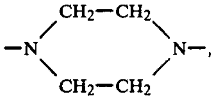

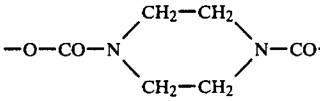 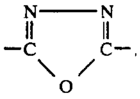

—O—CO—O—, —CO—O—, —CO—CO—,

—O—$(CH_2)_m$—O—, 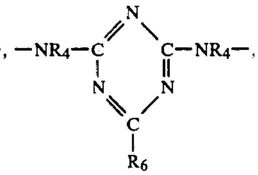

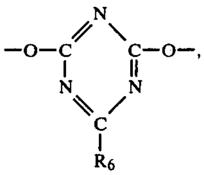 , —CO—$NR_4$—$R_7$—$NR_4$—CO—,

—CO—$NR_4$—$(CH_2)_m$—O—$(CH_2)_m$—$NR_4$—CO—,
—CO—$NR_4$—$(CH_2)_m$—$NCH_3$—$(CH_2)_m$—$NR_4$—CO—,
—CO—$NR_4$—$(CH_2)_m$—O—$(CH_2)_m$—O—$(CH_2)_m$—$NR_4$—CO—,
—$CH_2$—CO—$NR_4$—, —CH═CH—CO—$NR_4$—,
—$CH_2CH_2$—CO—$NR_4$—, —$CH_2$—O—$CH_2$—, —N═N—,
—SO—, —$CH_2$—S—$CH_2$—, —$CH_2$—SO—$CH_2$— or
—$CH_2$—$SO_2$—$CH_2$—.

wherein each $R_4$ is independently hydrogen or $C_{1-4}$alkyl, $R_5$ is chloro, bromo, $C_{1-4}$alkyl or $C_{1-4}$alkoxy, $R_6$ is chloro, bromo, —NH—$CH_2CH_2OH$ or —N$(CH_2CH_2OH)_2$, $R_7$ is straight or branched $C_{1-4}$alkylene, and each m is independently 1, 2, 3 or 4.

3. A 2:1 metal complex according to claim 2 wherein n is 2–8.

4. A 2:1 metal complex according to claim 3 wherein X is a direct bond, $-CH_2-$, $-CH_2CH_2-$, $-(CH_2)_3-$, $-(CH_2)_4-$, $-S-$, $-O-$, $-CH{=}CH-$, $-NH-$, $-NH-CO-$, $-N(CH_3)-CO-$, 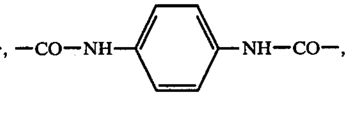

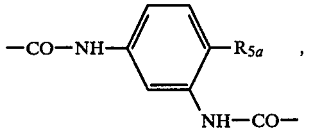

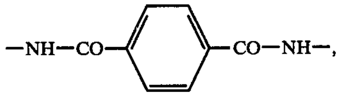

$-NH-CO-CH_2CH_2-CO-NH-$,
$-NH-CO-(CH_2)_4-CO-NH-$,
$-N(CH_3)-CO-CH_2CH_2-CO-N(CH_3)-$,
$-NH-CO-CH{=}CH-CO-NH-$,
$-N(CH_3)-CO-CH{=}CH-CO-N(CH_3)-$,
$-NH-CO-NH-$, $-N(CH_3)-CO-N(CH_3)-$, $-CO-NH-NH-CO-$, 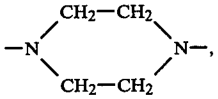

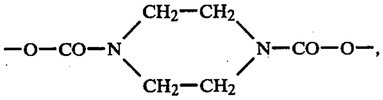 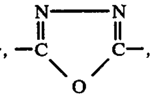

$-CO-CO-$, 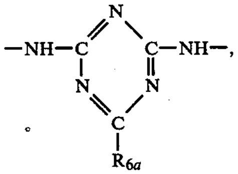

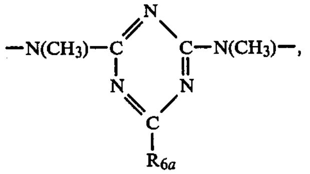

$-CO-NH-CH_2CH_2-NH-CO-$,
$-CO-NH-(CH_2)_3-NH-CO-$,
$-CO-NH-(CH_2)_4-NH-CO-$,
$-CO-N(CH_3)-CH_2CH_2-N(CH_3)-CO-$,

-continued

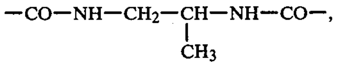

$-CO-N(CH_3)-CH_2CH_2-NH-CO-$,
$-CH{=}CH-CO-NH-$, $-CH_2CH_2-CO-NH-$ or $-N{=}N-$, wherein $R_{5a}$ is chloro, methyl or methoxy, and $R_{6a}$ is chloro, $-NH-CH_2CH_2OH$ or $-N(CH_2CH_2OH)_2$.

5. A 2:1 metal complex according to claim 4 wherein X is a direct bond, $-CH_2-$, $-CH_2CH_2-$, $-CH{=}CH-$, $-NH-CO-$, $-N(CH_3)-CO-$, 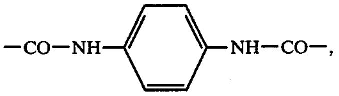

$-NH-CO-CH_2CH_2-CO-NH-$,
$-N(CH_3)-CO-CH_2CH_2-CO-N(CH_3)-$,
$-NH-CO-CH{=}CH-CO-NH-$,
$-N(CH_3)-CO-CH{=}CH-CO-N(CH_3)-$, $-NH-CO-NH-$, 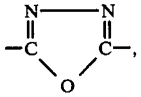

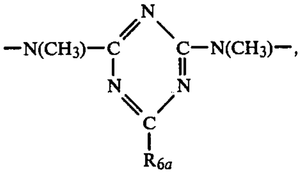

$-CO-NH-CH_2CH_2-NH-CO-$,
$-CO-N(CH_3)-CH_2CH_2-N(CH_3)-CO-$,

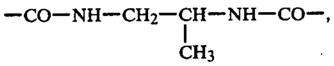

$-CH_2CH_2-CO-NH-$ or $-N{=}N-$, wherein $R_{6a}$ is chloro, $-NH-CH_2CH_2OH$ or $-N(CH_2CH_2OH)_2$.

6. A 2:1 metal complex according to claim 3 wherein the two parts of the molecule attached to X are identical.

7. A 2:1 metal complex according to claim 3 wherein each Me is copper.

8. A 2:1 metal complex according to claim 3 having the formula

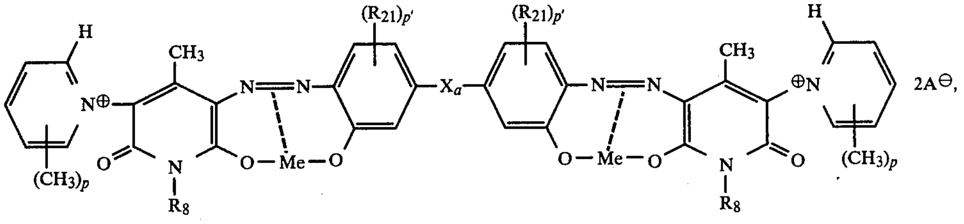

wherein each $R_8$ is independently hydrogen, methyl or 2-hydroxyethyl, each $R_{21}$ is independently chloro, bromo, $C_{1-4}$alkyl or $C_{1-4}$alkoxy, $X_a$ is a direct bond, $-CH_2-$, $-CH_2CH_2-$, $-(CH_2)_3-$, $-(CH_2)_4-$, $-S-$, $-O-$, $-CH=CH-$, $-NH-$, $-NH-CO-$, $-N(CH_3)-CO-$, 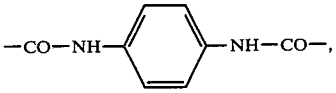

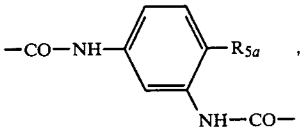

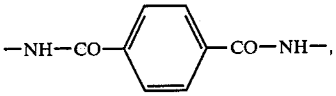

$-NH-CO-CH_2CH_2-CO-NH-$,
$-NH-CO-(CH_2)_4-CO-NH-$,
$-N(CH_3)-CO-CH_2CH_2-CO-N(CH_3)-$,
$-NH-CO-CH=CH-CO-NH-$,
$-N(CH_3)-CO-CH=CH-CO-N(CH_3)-$,
$-NH-CO-NH-$, $-N(CH_3)-CO-N(CH_3)-$, $-CO-NH-NH-CO-$, 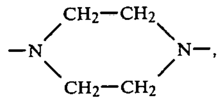

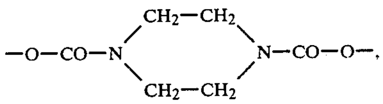 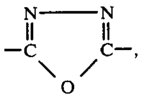

$-CO-CO-$, 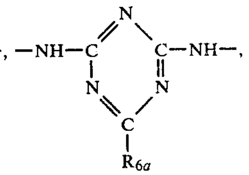

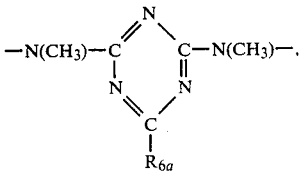

$-CO-NH-CH_2CH_2-NH-CO-$,

-continued $-CO-NH-(CH_2)_3-NH-CO-$,
$-CO-NH-(CH_2)_4-NH-CO-$,
$-CO-N(CH_3)-CH_2CH_2-N(CH_3)-CO-$, $-CO-NH-CH_2-CH-NH-CO-$,
$\qquad\qquad\quad | $
$\qquad\qquad\; CH_3$ $-CO-N(CH_3)-CH_2CH_2-NH-CO-$,
$-CH=CH-CO-NH-$, $-CH_2CH_2-CO-NH-$ or $-N=N-$, wherein $R_{5a}$ is chloro, methyl or methoxy, and $R_{6a}$ is chloro, $-NH-CH_2CH_2OH$ or $-N(CH_2CH_2OH)_2$, each Me is independently copper, cobalt, iron, nickel, manganese or zinc, each $A^{\ominus}$ is independently a non-chromophoric anion, each p is independently 0, 1 or 2, and each p' is independently 0 or 1.

9. A 2:1 metal complex according to claim 3 having the formula

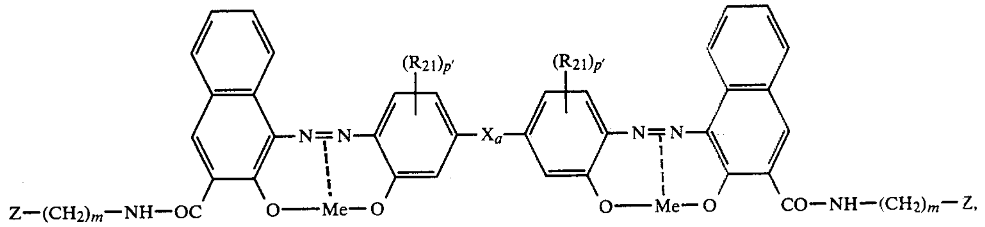

wherein each $R_{21}$ is independently chloro, bromo, $C_{1-4}$alkyl or $C_{1-4}$alkoxy, $X_a$ is a direct bond, $-CH_2-$, $-CH_2CH_2-$, $-(CH_2)_3-$, $-(CH_2)_4-$, $-S-$, $-O-$, $-CH=CH-$, $-NH-$, $-NH-CO-$ $-N(CH_3)-CO-$, 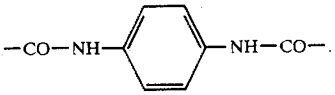

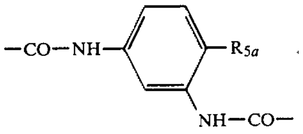

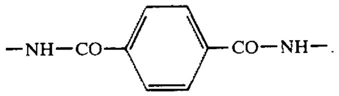

$-NH-CO-CH_2CH_2-CO-NH-$,
$-NH-CO-(CH_2)_4-CO-NH-$,
$-N(CH_3)-CO-CH_2CH_2-CO-N(CH_3)-$,
$-NH-CO-CH=CH-CO-NH-$,
$-N(CH_3)-CO-CH=CH-CO-N(CH_3)-$
$-NH-CO-NH-$, $-N(CH_3)-CO-N(CH_3)-$

-continued

—CO—NH—NH—CO—, 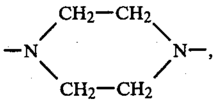

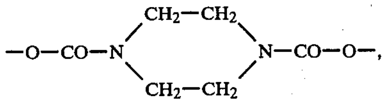 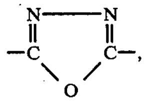

—CO—CO—, 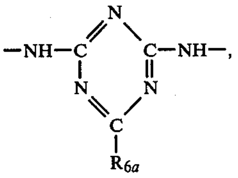

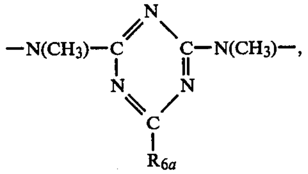

—CO—NH—$CH_2CH_2$—NH—CO—,
—CO—NH—$(CH_2)_3$—NH—CO—,
—CO—NH—$(CH_2)_4$—NH—CO—,
—CO—$N(CH_3)$—$CH_2CH_2$—$N(CH_3)$—CO—,

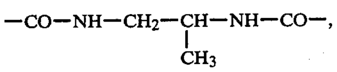

—CO—$N(CH_3)$—$CH_2CH_2$—NH—CO—,
—CH=CH—CO—NH—, —$CH_2CH_2$—CO—NH— or —N=N—, wherein $R_{5a}$ is chloro, methyl or methoxy, and $R_{6a}$ is chloro, —NH—$CH_2CH_2OH$ or —$N(CH_2CH_2OH)_2$, each Z is independently —$N(CH_3)_2$, 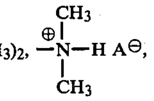

$-\overset{\oplus}{N}(CH_3)_3\ A^{\ominus}$, 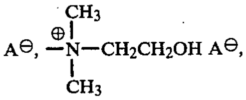

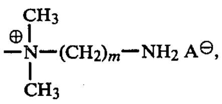 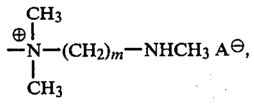

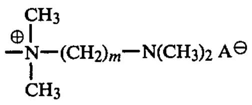 or

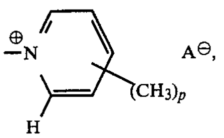

wherein $A^{\ominus}$ is a non-chromophoric anion, m is 1, 2, 3 or 4, and p is 0, 1 or 2, and each Me is independently copper, cobalt, iron, nickel, manganese or zinc, each m is independently 1, 2, 3 or 4, and each p' is independently 0 or 1.

10. A 2:1 metal complex according to claim 3 having the formula

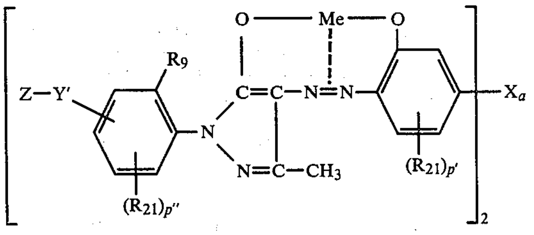

wherein each $R_9$ is independently hydrogen or $C_{1-4}$alkoxy, each $R_{21}$ is independently chloro, bromo, $C_{1-4}$alkyl or $C_{1-4}$alkoxy, $X_a$ is a direct bond, —$CH_2$—, —$CH_2CH_2$—, —$(CH_2)_3$—, —$(CH_2)_4$—, —S—, —O—, —CH=CH—, —NH—, —NH—CO—, —$N(CH_3)$—CO—, 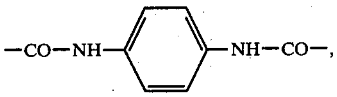

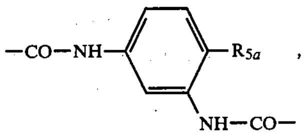

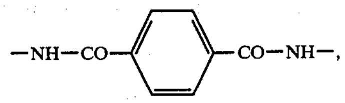

—NH—CO—$CH_2CH_2$—CO—NH—,
—NH—CO—$(CH_2)_4$—CO—NH—,
—$N(CH_3)$—CO—$CH_2CH_2$—CO—$N(CH_3)$—,
—NH—CO—CH=CH—CO—NH—,
—$N(CH_3)$—CO—CH=CH—CO—$N(CH_3)$—,
—NH—CO—NH—, —$N(CH_3)$—CO—$N(CH_3)$—,

—CO—NH—NH—CO—, 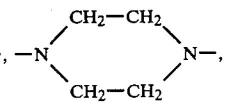

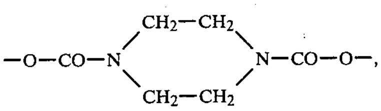 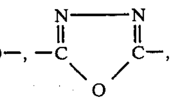

-continued

—CO—CO—, 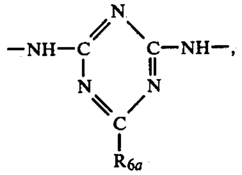

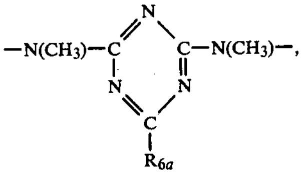

$-CO-NH-CH_2CH_2-NH-CO-$,
$-CO-NH-(CH_2)_3-NH-CO-$,
$-CO-NH-(CH_2)_4-NH-CO-$,
$-CO-N(CH_3)-CH_2CH_2-N(CH_3)-CO-$, $-CO-NH-CH_2-\underset{CH_3}{CH}-NH-CO-$, $-CO-N(CH_3)-CH_2CH_2-NH-CO-$,
$-CH{=}CH-CO-NH-$, $-CH_2CH_2-CO-NH-$ or $-N{=}N-$, wherein
$R_{5a}$ is chloro, methyl or methoxy, and
$R_{6a}$ is chloro, $-NH-CH_2CH_2OH$ or $-N(CH_2CH_2OH)_2$,
each
Y' is independently a direct bond, $-CH_2-$, $-CO-NH-(CH_2)_m-$*, $-NH-CO-(CH_2)_m-$* or $-SO_2-NR_4-(CH_2)_m-$***,
wherein
$R_4$ is hydrogen or $C_{1-4}$alkyl,
m is 1, 2, 3 or 4, and
the *** denotes the carbon atom attached to Z, each
Z is independently $-N(CH_3)_2$, $-\overset{\oplus}{\underset{CH_3}{\overset{CH_3}{N}}}-H\ A^\ominus$, $-\overset{\oplus}{N}(CH_3)_3\ A^\ominus$, $-\overset{\oplus}{\underset{CH_3}{\overset{CH_3}{N}}}-CH_2CH_2OH\ A^\ominus$, $-\overset{\oplus}{\underset{CH_3}{\overset{CH_3}{N}}}-(CH_2)_m-NH_2\ A^\ominus$, $-\overset{\oplus}{\underset{CH_3}{\overset{CH_3}{N}}}-(CH_2)_m-NHCH_3\ A^\ominus$, $-\overset{\oplus}{\underset{CH_3}{\overset{CH_3}{N}}}-(CH_2)_m-N(CH_3)_2\ A^\ominus$ or

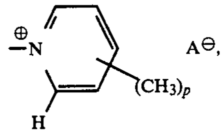 $A^\ominus$, wherein
$A^\ominus$ is a non-chromophoric anion,
m is 1, 2, 3 or 4, and
p is 0, 1 or 2,
each
Me is independently copper, cobalt, iron, nickel, manganese or zinc,
each
p' is independently 0 or 1, and
each
p'' is independently 0, 1 or 2, with the proviso that p'' is 0 or 1 when the $R_9$ on the same ring is $C_{1-4}$alkoxy.

11. A 2:1 metal complex according to claim 10 wherein Y' is $-CH_2-$, $-CO-NH-(CH_2)_{m'}-$*, $-NH-CO-CH_2-$* or $-SO_2-NH-(CH_2)_{m'}$*, wherein m' is 2 or 3, and the * denotes the carbon atom attached to Z.

12. A 2:1 metal complex according to claim 11 wherein each $R_9$ is independently hydrogen or methoxy,
each
Me is copper,
each
p' is 0, and
each
p'' is 0.

13. A 2:1 metal complex according to claim 12 having the formula

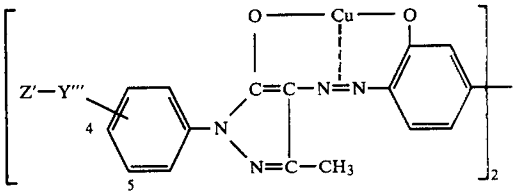

wherein $X_b$ is a direct bond, $-CH_2-$, $-CH_2CH_2-$, $-CH{=}CH-$, $-NH-CO-$, $-N(CH_3)-CO-$, $-CO-NH-$ 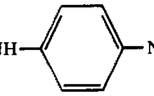 $-NH-CO-$, $-NH-CO-CH_2CH_2-CO-NH-$,
$-N(CH_3)-CO-CH_2CH_2-CO-N(CH_3)-$,
$-NH-CO-CH{=}CH-CO-NH-$,
$-N(CH_3)-CO-CH{=}CH-CO-N(CH_3)-$, $-NH-CO-NH-$, 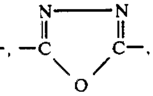

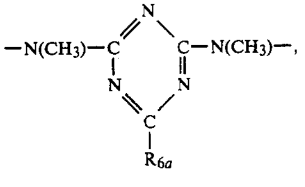

$-CO-NH-CH_2CH_2-NH-CO-$,
$-CO-N(CH_3)-CH_2CH_2-N(CH_3)-CO-$, $-CO-NH-CH_2-\underset{CH_3}{CH}-NH-CO-$, -continued $-CH_2CH_2-CO-NH-$ or $-N{=}N-$, wherein $R_{6a}$ is chloro, $-NH-CH_2CH_2OH$ or $-N(CH_2CH_2OH)_2$, each $Y'''$ is $-CH_2-$, $-CO-NH-(CH_2)_3-$* or $-NH-CO-CH_2-$*, wherein the *** denotes the carbon atom attached to $Z'$, and each $Z'$ is

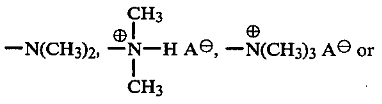

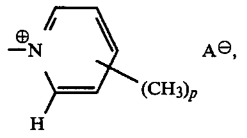

wherein $A^{\ominus}$ is a non-chromophoric anion, and p is 0, 1 or 2, with the proviso tht the two parts of the molecule attached to $X_b$ are identical.

14. A 2:1 metal complex according to claim 13 wherein each $Z'-Y'''-$ group is in the 4-position or each is in the 5-position.

15. A 2:1 metal complex according to claim 14 wherein each $Z'$ is

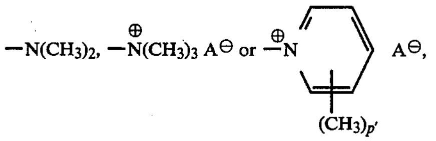

wherein $A^{\ominus}$ is a non-chromophoric anion, and $p'$ is 0 or 1.

16. A 2:1 metal complex according to claim 3 having the formula

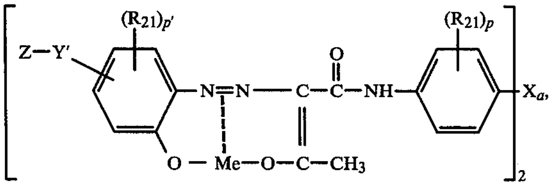

wherein each $R_{21}$ is independently chloro, bromo, $C_{1-4}$alkyl or $C_{1-4}$alkoxy, $X_a$ is a direct bond, $-CH_2-$, $-CH_2CH_2-$, $-(CH_2)_3-$, $-(CH_2)_4-$, $-S-$, $-O-$, $-CH{=}CH-$, $-NH-$, $-NH-CO-$,

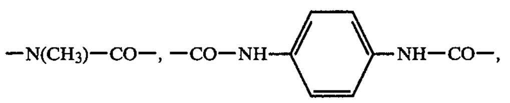

-continued

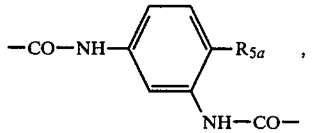

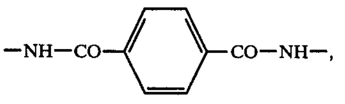

$-NH-CO-CH_2CH_2-CO-NH-$, $-NH-CO-(CH_2)_4-CO-NH-$, $-N(CH_3)-CO-CH_2CH_2-CO-N(CH_3)-$, $-NH-CO-CH{=}CH-CO-NH-$, $-N(CH_3)-CO-CH{=}CH-CO-N(CH_3)-$, $-NH-CO-NH-$, $-N(CH_3)-CO-N(CH_3)-$, $-CO-NH-NH-CO-$,

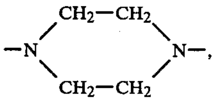

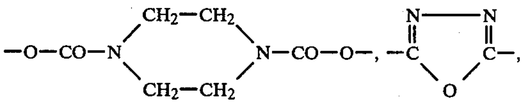

$-CO-CO-$,

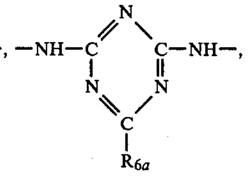

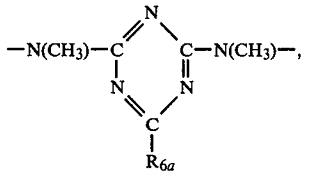

$-CO-NH-CH_2CH_2-NH-CO-$, $-CO-NH-(CH_2)_3-NH-CO-$, $-CO-NH-(CH_2)_4-NH-CO-$, $-CO-N(CH_3)-CH_2CH_2-N(CH_3)-CO-$,

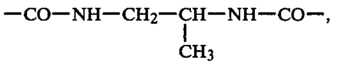

$-CO-N(CH_3)-CH_2CH_2-NH-CO-$, $-CH{=}CH-CO-NH-$, $-CH_2CH_2-CO-NH-$ or $-N{=}N-$, wherein $R_{5a}$ is chloro, methyl or methoxy, and $R_{6a}$ is chloro, $-NH-CH_2CH_2OH$ or $-N(CH_2CH_2OH)_2$, each $Y'$ is independently a direct bond, $-CH_2-$, $-CO-NH-(CH_2)_m-$*, $-NH-CO-(CH_2)_m-$* or $-SO_2-NR_4-(CH_2)_m-$*, wherein $R_4$ is hydrogen or $C_{1-4}$alkyl, m is 1, 2, 3 or 4, and the * denotes the carbon atom attached to Z, each Z is independently $-N(CH_3)_2$, 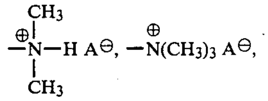

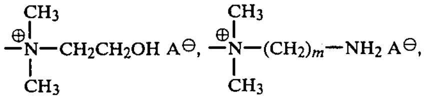

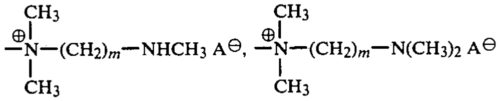 or

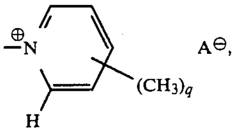

wherein $A^\ominus$ is a non-chromophoric anion, m is 1, 2, 3 or 4, and q is 0, 1 or 2, each Me is independently copper, cobalt, iron, nickel, manganese or zinc, each p is independently 0, 1 or 2, and each p' is independently 0 or 1.

17. A 2:1 metal complex according to claim 16 wherein $X_a$ is a direct bond, $-CH_2-$, $-CH_2CH_2-$, $-CH=CH-$, $-NH-CO-$, $-N(CH_3)-CO-$, 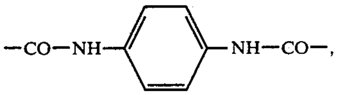

$-NH-CO-CH_2CH_2-CO-NH-$,
$-N(CH_3)-CO-CH_2CH_2-CO-N(CH_3)-$,
$-NH-CO-CH=CH-CO-NH-$,
$-N(CH_3)-CO-CH=CH-CO-N(CH_3)-$, $-NH-CO-NH-$, 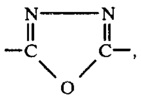

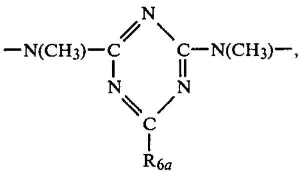

$-CO-NH-CH_2CH_2-NH-CO-$,
$-CO-N(CH_3)-CH_2CH_2-N(CH_3)-CO-$,

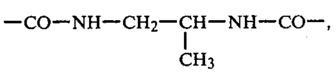

$-CH_2CH_2-CO-NH-$ or $-N=N-$, wherein $R_{6a}$ is chloro, $-NH-CH_2CH_2OH$ or $-N(CH_2CH_2OH)_2$, each Y' is $-CH_2-$, $-CO-NH-(CH_2)_{m'}-$*, $-NH-CO-CH_2-$* or $-SO_2-NH-(CH_2)_{m'}-$*, wherein m' is 2 or 3, and the * denotes the carbon atom attached to Z, each Z is $-N(CH_3)_2$, 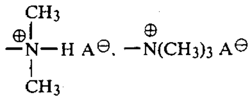 or

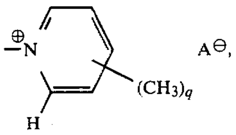

wherein $A^\ominus$ is a non-chromophoric anion, and q is 0, 1 or 2, each

Me is copper, each p is 0, and each p' is 0, with the proviso that the two parts of the molecule attached to $X_a$ are identical.

18. A 2:1 metal complex according to claim 8 wherein $X_a$ is a direct bond, $-CH_2-$, $-CH_2CH_2-$, $-CH=CH-$, $-NH-CO-$, $-N(CH_3)-CO-$, 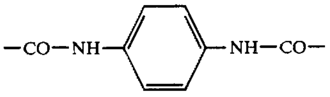

$-NH-CO-CH_2CH_2-CO-NH-$,
$-N(CH_3)-CO-CH_2CH_2-CO-N(CH_3)-$,
$-NH-CO-CH=CH-CO-NH-$,
$-N(CH_3)-CO-CH=CH-CO-N(CH_3)-$, $-NH-CO-NH-$, 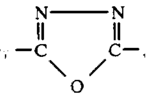

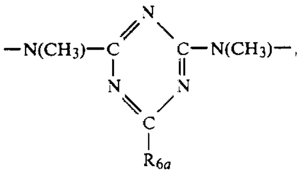

$-CO-NH-CH_2CH_2-NH-CO-$,
$-CO-N(CH_3)-CH_2CH_2-N(CH_3)-CO-$

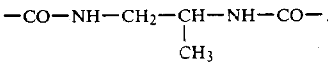

$-CH_2CH_2-CO-NH-$ or $-N=N-$.

wherein $R_{6a}$ is chloro, $-NH-CH_2CH_2OH$ or $-N(CH_2CH_2OH)_2$, each

Me is copper, each p is 0 or 1, and each p' is 0, with the proviso that the two parts of the molecule attached to $X_a$ are identical.

19. A 2:1 metal complex according to claim 9 wherein $X_a$ is a direct bond, $-CH_2-$, $-CH_2CH_2-$, $-CH=CH-$, $-NH-CO-$, $-N(CH_3)-CO-$, 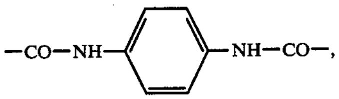

$-NH-CO-CH_2CH_2-CO-NH-$,
$-N(CH_3)-CO-CH_2CH_2-CO-N(CH_3)-$,
$-NH-CO-CH=CH-CO-NH-$,
$-N(CH_3)-CO-CH=CH-CO-N(CH_3)-$, $-NH-CO-NH-$, 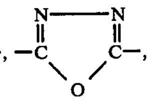

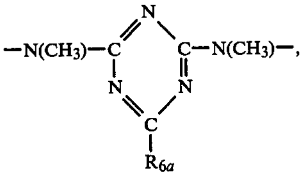

$-CO-NH-CH_2CH_2-NH-CO-$,
$-CO-N(CH_3)-CH_2CH_2-N(CH_3)-CO-$,

-continued

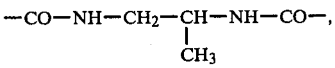

$-CH_2CH_2-CO-NH-$ or $-N=N-$, wherein $R_{6a}$ is chloro, $-NH-CH_2CH_2OH$ or $-N(CH_2CH_2OH)_2$, each Z is $-N(CH_3)_2$, 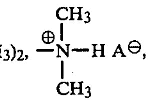 $-\overset{\oplus}{N}(CH_3)_3\ A^{\ominus}$ or

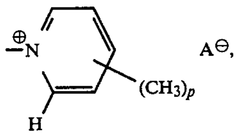

$A^{\ominus}$, wherein $A^{\ominus}$ is a non-chromophoric anion, and p is 0, 1 or 2, each Me is copper, each m is 2 or 3, and each p' is 0, with the proviso that the two parts of the molecule attached to $X_a$ are identical.

20. The compound according to claim 15 having the formula

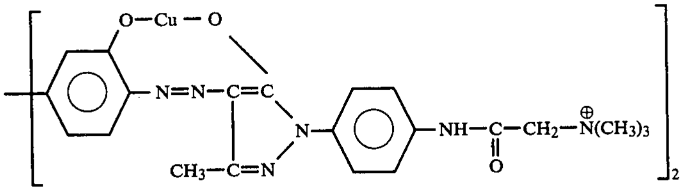

$2Cl^{\ominus}$.

* * * * *